(12) United States Patent
Martinez et al.

(10) Patent No.: US 10,185,578 B2
(45) Date of Patent: *Jan. 22, 2019

(54) BASIC INPUT/OUTPUT SYSTEM (BIOS) SECURITY DISPLAY

(71) Applicant: Dell Products L.P., Round Rock, TX (US)

(72) Inventors: Ricardo L. Martinez, Leander, TX (US); Richard M. Tonry, Austin, TX (US); Christopher W. Ramirez, Leander, TX (US)

(73) Assignee: Dell Products L.P., Round Rock ( * ) Notice: Subject to any disclaimer, the term of this patent is extended or adjusted under 35 U.S.C. 154(b) by 106 days.

This patent is subject to a terminal disclaimer.

(21) Appl. No.: 15/342,931

(22) Filed: Nov. 3, 2016

(65) Prior Publication Data

US 2017/0068553 A1  Mar. 9, 2017

Related U.S. Application Data

(63) Continuation of application No. 14/563,848, filed on Dec. 8, 2014, now Pat. No. 9,519,785.

(51) Int. Cl.
*G06F 21/57* (2013.01)
*G06F 9/445* (2018.01)
*G06F 9/4401* (2018.01)

(52) U.S. Cl.
CPC ........ *G06F 9/44505* (2013.01); *G06F 9/4401* (2013.01); *G06F 9/4406* (2013.01); *G06F 21/572* (2013.01); *G06F 2221/034* (2013.01); *G06F 2221/2113* (2013.01)

(58) Field of Classification Search
CPC ... H04L 63/20; H04L 63/102; H04L 63/0227; G06F 21/6218; G06F 21/604
See application file for complete search history.

(56) References Cited

U.S. PATENT DOCUMENTS

| | | | |
|---|---|---|---|
| 6,658,562 B1 | 12/2003 | Bonomo et al. | |
| 9,519,785 B2 * | 12/2016 | Martinez | G06F 9/4401 |
| 2007/0255937 A1 | 11/2007 | Lo | |
| 2014/0122859 A1 | 5/2014 | Ruelas | |

* cited by examiner

*Primary Examiner* — Baotran N To
(74) *Attorney, Agent, or Firm* — Baker Botts L.L.P.

(57) ABSTRACT

Methods and systems for generating and using a BIOS security display include determining whether a change in a BIOS user setting is associated with security of an information handling system. When the BIOS user setting is associated with security, a security level for the BIOS may be calculated based on weighted security values for BIOS user settings. Security levels for boot phases may also be individually calculated. The security levels may be displayed in the BIOS to the user when the BIOS user setting is changed.

18 Claims, 4 Drawing Sheets

BASIC INPUT/OUTPUT SYSTEM (BIOS) SECURITY DISPLAY

RELATED APPLICATIONS

This application is a continuation of U.S. patent application Ser. No. 14/563,848 filed Dec. 8, 2014, the contents of which is incorporated by reference herein.

BACKGROUND

Field of the Disclosure

This disclosure relates generally to information handling systems and more particularly to a basic input/output system (BIOS) security display.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a basic input/output system (BIOS) may include BIOS firmware for various hardware management tasks.

SUMMARY

In one aspect, a disclosed method includes detecting a change in a user setting of a BIOS for an information handling system. Responsive to detecting the change, the method may include determining whether the user setting is associated with security of the information handling system. When the user setting is associated with security of the information handling system, the method may include determining a weighted security value for the user setting. The weighted security value may indicate a relative importance to security of the information handling system for the user setting. Based at least in part on the weighted security value, the method may include calculating a security level for the BIOS. The method may also include updating a display element included in a BIOS user interface, the display element indicative of the security level for the BIOS.

Other disclosed aspects include article of manufacture comprising a non-transitory computer-readable medium storing instructions executable by a processor, and the information handling system comprising a processor subsystem having access to the BIOS.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
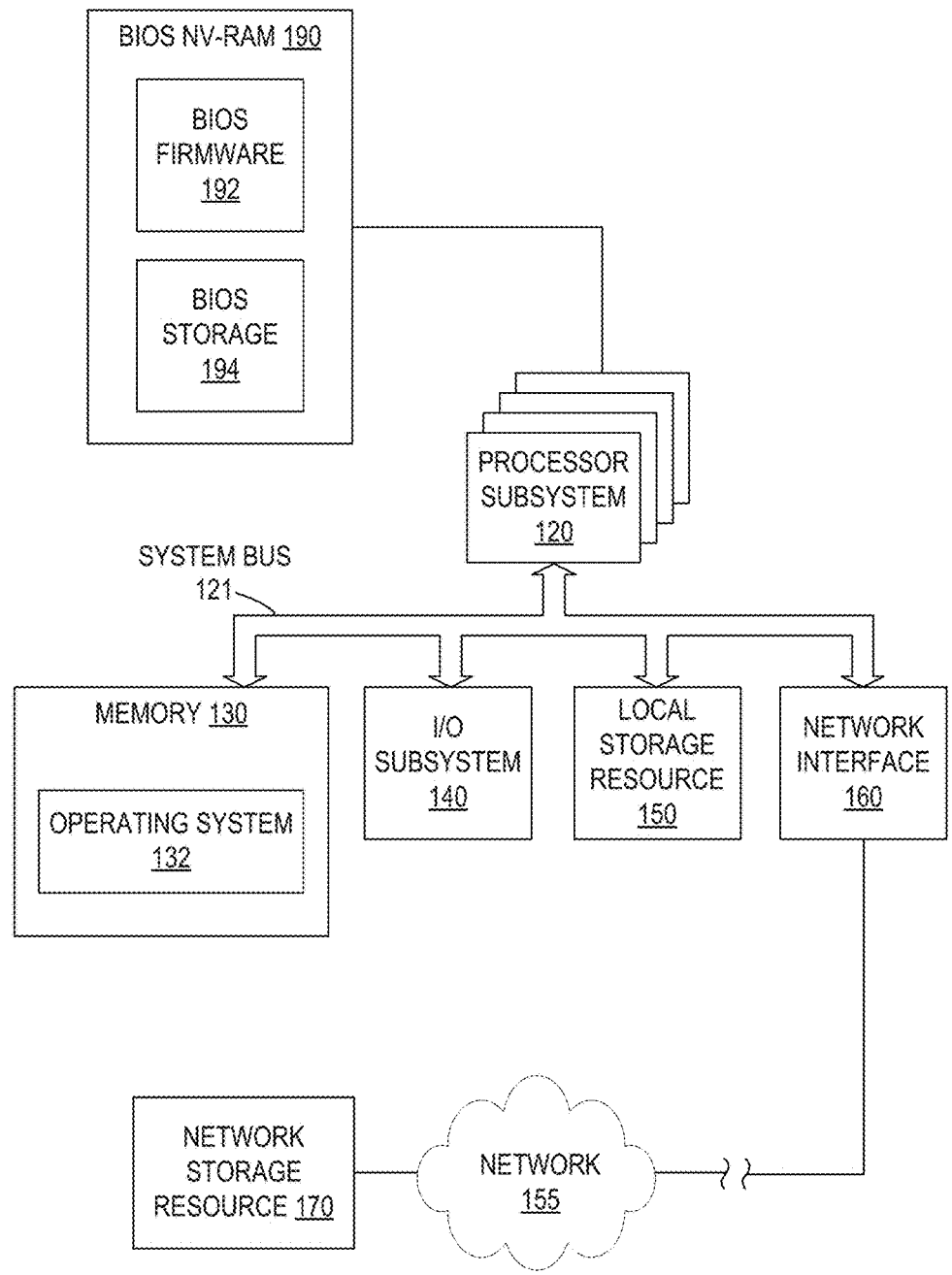
FIG. 1 is a block diagram of selected elements of an embodiment of an information handling system using a BIOS security display.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include BIOS firmware that may control certain hardware elements and may provide for user management of the hardware elements. A BIOS non-volatile memory may store BIOS firmware that includes a BIOS setup program, which includes a user interface with BIOS settings for the information handling system that are accessible to a user for modification, which are referred to herein as "user settings" or "BIOS user settings". In certain embodiments, the BIOS user settings may be specific to a particular user or a user account when supported by the BIOS. In a typical implementation, a user may enter the BIOS setup program prior to booting the information handling system and may view, modify, and save numerous BIOS user settings using the BIOS setup program.

Although users of information handling systems may realize that computer security is important, many typical users may be overwhelmed by challenges in implementing a desired level of security on their information handling systems. In particular, implementing the desired level of security may involve knowledge of a large amount of information, such as proper guidance and procedures for security. Additionally, users may be exposed to a number of security products that are available, each of which may involve different functionality, features, and designs, as well as different versions and updates for any particular security product. Thus, due to the extensive effort involved with negotiating such large amounts of information and security product choices, many users may feel overwhelmed and confused by security technologies and may even simply disable security features as a result.

In particular, the BIOS, using the BIOS setup program, may enable configuration of certain hardware aspects of the information handling system that are relevant for computer security. For example, the BIOS setup program may include various switches and features designed to increase the security of the platform from malicious activity. However, unless the user operating the BIOS setup program is familiar with each technology or feature, the user may not be aware of security implications of changing certain BIOS user settings, such as whether a particular change in a BIOS user setting increases or decreases security of the information handling system. Furthermore, certain BIOS user settings may be associated with one another, such that modifying a first BIOS user setting may also change or negate a second BIOS user setting, which may appear to the user to be unrelated to the first BIOS user setting. When launched, the BIOS may operate in a critical and privileged mode, while BIOS security features may provide a foundation and root for the chain of trust for additional layers of security at the operating system level. To the extent that the security status is based on selections of user settings in the BIOS setup program, an improperly configured BIOS may result in adverse security consequences that a user may be unaware of Therefore, it is advantageous for the user to be aware of a comprehensive security status of their information handling system within the context of operation of the BIOS and the BIOS setup program.

As will be described in further detail herein, the inventors of the present disclosure have developed a BIOS security display that includes a display element in the form of a security indicator that may be included within a user interface of the BIOS setup program. The security indicator may be dynamically updated when the user changes certain BIOS settings in the BIOS setup program. Specifically, the security indicator may display one or more values indicative of a security level of the information handling system. The values indicative of the security level may be displayed as numerical values, such as integer or real numbers, for example using a defined numeric scale of the security level. The values indicative of the security level may be displayed as non-numeric or relative values, for example, using color or other continuous-scale indicators, or various combinations thereof. In this manner, the security indicator may provide immediate and direct feedback to the user about the security implications of actual BIOS user settings when being modified by the user.

Particular embodiments are best understood by reference to FIGS. 1, 2A, 2B, 3 and 4, wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel may include circuitry for enabling touch functionality in conjunction with a display that is driven by display adapter.

Also shown in FIG. 1 is BIOS non-volatile random access memory (NV-RAM) 190, often simply or collectively referred to as the 'BIOS'. As shown, BIOS NV-RAM 190 may include BIOS firmware 192, representing pre-boot instructions executable by processor subsystem 120, for example, for preparing information handling system 100 to boot by activating various hardware components in preparation of launching operating system 132 for execution. BIOS firmware 192 may further include instructions for displaying a user interface (also referred to herein as a BIOS setup program) by which a user may access, modify, and store BIOS user settings. Also shown stored in BIOS NV-RAM 190 is BIOS storage 194, which may represent data, such as program code, settings, data values, etc. that BIOS firmware 192 may store. In certain embodiments, BIOS firmware 192 may have access to network interface 160 for various types of communication, such as with a network administrator. In certain embodiments, at least a portion of BIOS storage 194 may physically reside on a remote storage resource, such as in network storage resource 170.

In operation, when information handling system 100 is powered on, BIOS firmware 192 may be launched and may execute. As referred to herein, BIOS firmware 192 may represent instructions executing on processor subsystem 120. It is noted that other processors and/or processor subsystems, such as an embedded controller (EC) or a secondary processor (not shown), may be used to execute BIOS firmware 192 in various embodiments. When the user initiates BIOS setup, BIOS firmware 192 may execute the BIOS setup program prior to booting operating system 132.

The BIOS setup program may implement various features for providing the BIOS security display, as described herein. The BIOS setup program may implement a method to apply a weight to individual BIOS user settings that are associated with security features. The weight may be indicative of the direct impact that a BIOS user setting has on the overall state of system security. In some embodiments, particular BIOS user settings that are associated with security features may be determined in the BIOS setup program during development or compilation.

The BIOS setup program may access, or may include, a weighting and association database that may provide weighted security values for various BIOS user settings of the BIOS. The database may be accessed in the form of a lookup table to find a particular weighted security value for a particular BIOS user setting (see also Table 2 below). The database may be populated prior to use, for example, when the BIOS setup program is implemented. The weighted security value may then be used for security level calculations, as will be described in further detail below, to determine one or more security levels for the information handling system or the BIOS. Based on the calculated security levels, a BIOS security display may be generated and displayed in the BIOS setup program. In particular embodiments, the BIOS security display includes a display element in the form of a security indicator, such as a dial, a gauge, a meter, a bar, a level, or other type of numeric indicator. The display element may be updated when a BIOS user setting is modified, thereby providing immediate visual feedback to the user of a measure of security impacts of modifying various BIOS user settings.

In certain embodiments, an immediate alert or notification in addition to the display element may be generated and displayed to the user based on certain changes to the calculated security levels. For example, when a security level falls to below a pre-defined critical value, an immediate alert may be generated, which may assist the user in avoiding or preventing undesired or insufficiently secure BIOS configurations from being stored.

Example embodiments of the security level calculations will now be described in further detail. In various embodiments, a weighted average may be calculated for a particular BIOS user setting based on weight mappings for individual BIOS user settings. The weighted average may then be used to calculate various security levels, such as an overall security level, for the BIOS. The calculated security levels may be displayed to the user in various ways. In the exemplary embodiments described below, the security levels are displayed using a normalized scale of 1 to 10, where 1 is a minimum security level and 10 is a maximum security level, and where decimal numeric values between 1 and 10 may be used. It is noted that other scales and values for the security level may be used in different embodiments.

Furthermore, as an additional security measure, additional mapping of BIOS user settings may involve designating a boot phase for each BIOS user setting. The boot phase may indicate which portion of the boot process a particular BIOS user setting impacts. In the exemplary embodiments described herein, the boot phase may have the values shown in Table 1.

TABLE 1

EXEMPLARY BOOT PHASES FOR BIOS USER SETTINGS

| BOOT PHASE | DESCRIPTION |
|---|---|
| PRE-BOOT | affects pre-boot operation, such as access to the BIOS |
| BOOT | affects the boot process, such as logical or physical storage devices to boot from |
| RUNTIME | affects operation after the boot process |

It is noted that in different embodiments, fewer or more boot phases than shown in Table 1 may be used. When BIOS user settings are mapped to particular boot phases, the resulting security level may also be calculated for the individual boot phases, respectively, as will be described in further detail herein.

An exemplary embodiment of data used for the weighting and association database that may provide weighted security values for various BIOS user settings of the BIOS is shown in Table 2.

TABLE 2

EXEMPLARY MAPPING OF BIOS USER SETTINGS TO WEIGHTED SECURITY VALUES

| BIOS USER SETTING | BOOT PHASE | ENABLED WEIGHT (1-10) | DISABLED WEIGHT (1-10) |
|---|---|---|---|
| Admin Password | PRE-BOOT | 10 | 1 |
| System Password | PRE-BOOT | 8 | 1 |
| Secure Boot | BOOT | 9 | 1 |
| PXE | BOOT | 1 | 7 |
| Trusted Execution | RUNTIME | 10 | 1 |
| USB | RUNTIME | 1 | 8 |
| Bluetooth | RUNTIME | 1 | 6 |

In Table 2, exemplary BIOS user settings are shown that have values of 'enabled' or 'disabled' for descriptive clarity. It will be understood that other types of BIOS user settings, such as those with numeric values, may also be implemented in given embodiments. As shown in Table 2, each BIOS user setting is assigned an enabled weight and a disabled weight, which represent the weighted security values, based on the normalized scale of 1 to 10, where 1 is a minimum security level and 10 is a maximum security level. Thus, certain BIOS user settings (such as 'Admin Password' and 'Trusted Execution') may have higher weighted security values when enabled, while other BIOS user settings (such as 'PXE' [Pre-Boot Execution Environment] and 'USB' [Universal Serial Bus]) may have higher weighted security values when disabled. When BIOS user settings include settings with numeric values (not shown in Table 2), additional factoring or conditional formulas may be used for the weighted security values, and may include different values than Boolean values (e.g., enabled or disabled).

Based on the values in Table 2, a phase scale factor may be calculated for each boot phase, as given in Table 3.

TABLE 3

EXEMPLARY PHASE SCALE FACTORS

| BOOT PHASE | SUM OF BOOT PHASE WEIGHT | SUM OF ALL BOOT PHASE WEIGHTS | BOOT PHASE SCALE FACTOR |
|---|---|---|---|
| PRE-BOOT | 18 | 58 | 0.310 |
| BOOT | 16 | 58 | 0.276 |
| RUNTIME | 24 | 58 | 0.414 |
| TOTAL | | | 1.000 |

In Table 3, the sum of boot phase weight is given by a sum of weights for the BIOS user settings for each boot phase in Table 2 for the high security value (e.g. either enabled or disabled). The sum of all boot phase weights is given by the sum of the boot phase weights. The boot phase scale factor may be calculated according to Equation 1 for each boot phase:

$$\text{Boot Phase Scale Factor} = \frac{\text{Sum of Boot Phase Weight}}{\text{Sum of All Boot Phase Weights}} \quad \text{Equation 1}$$

In Table 4, exemplary values for the BIOS user settings in Table 2 are shown, corresponding to values entered by a user in the present example.

TABLE 4

EXEMPLARY VALUES FOR BIOS USER SETTINGS

| BIOS USER SETTING | VALUE |
|---|---|
| Admin Password | enabled |
| System Password | disabled |
| Secure Boot | enabled |
| PXE | enabled |
| Trusted Execution | enabled |
| USB | disabled |
| Bluetooth | disabled |

In Table 5, boot phase security levels are calculated based on Tables 1-4 above.

TABLE 5

EXEMPLARY CALCULATION OF BOOT PHASE SECURITY LEVELS

| BOOT PHASE | BOOT PHASE SUM OF CURRENT VALUE | SUM OF BOOT PHASE WEIGHT | BOOT PHASE SECURITY LEVEL |
|---|---|---|---|
| PRE-BOOT | 11 | 18 | 6.111 |
| BOOT | 10 | 16 | 6.250 |
| RUNTIME | 19 | 24 | 7.917 |

In Table 5, the boot phase security level may be calculated according to Equation 2 for each boot phase:

$$\text{Boot Phase Security Level} = 10 * \frac{\text{Boot Phase Sum of Current Value}}{\text{Sum of Boot Phase Weight}} \quad \text{Equation 2}$$

Finally, a security level, indicative of aggregate BIOS user settings from all boot phases, may be calculated according to Equation 3:

$$\text{Security Level} = \sum_{n=1}^{P} \text{Boot Phase Security } Level_n * \text{Boot Phase Scale } Factor_n \quad \text{Equation 3}$$

In Equation 3, P is a total number of boot phases, which in the present example is 3. Substituting the actual values from Tables 3 and 5, the calculation of the security level according to Equation 3 is given in Equation 4:

$$\text{Security Level} = (6.111*0.310) + (6.250*0.276) + (7.917*0.414) = 6.895 \quad \text{Equation 4}$$

In this manner, boot phase security levels for individual boot phases may be calculated as shown in Table 5, as well as a security level for the overall BIOS, which may be calculated according to Equation 3, and as shown in Equation 4.

Figure 2A:
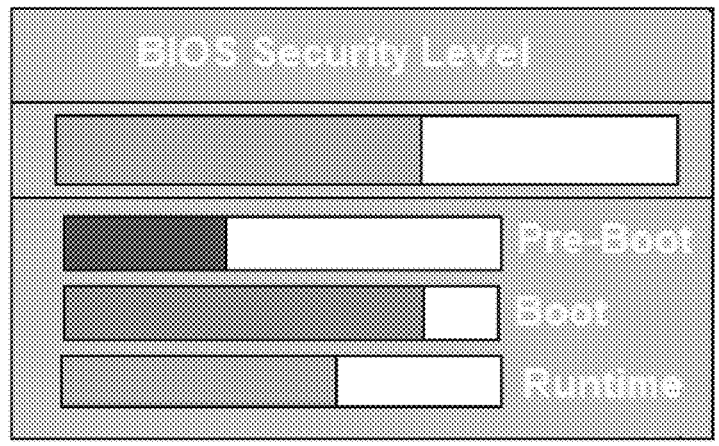
FIGS. 2A and 2B are selected elements of embodiments of display elements for a BIOS security display.
Figure 2B:

Referring now to FIGS. 2A and 2B, selected elements of an embodiment of display elements 200 and 201 are shown. As shown, display elements 200 and 201 may represent a BIOS security display that may be included within a user interface of the BIOS setup program. Display elements 200 and 201 may be security indicators that are updated when a user changes a BIOS user setting. It is noted that the designs of display elements 200 and 201 are exemplary and that other types of designs may be used, such as numeric displays, meters, horizontal and vertical scales, bars, charts, line graphs, 3D displays, among others. In FIGS. 2A and 2B, display elements 200 and 201 indicate the security level for the BIOS, as calculated according to Equation 4. Display elements 200 and 201 also indicate individual boot phase security levels, as calculated in Table 5. Although shown in grayscale, it is noted that display elements 200 and 201 may use color, such as yellow, green, and blue, to display different desired ranges for security levels.

Figure 3:
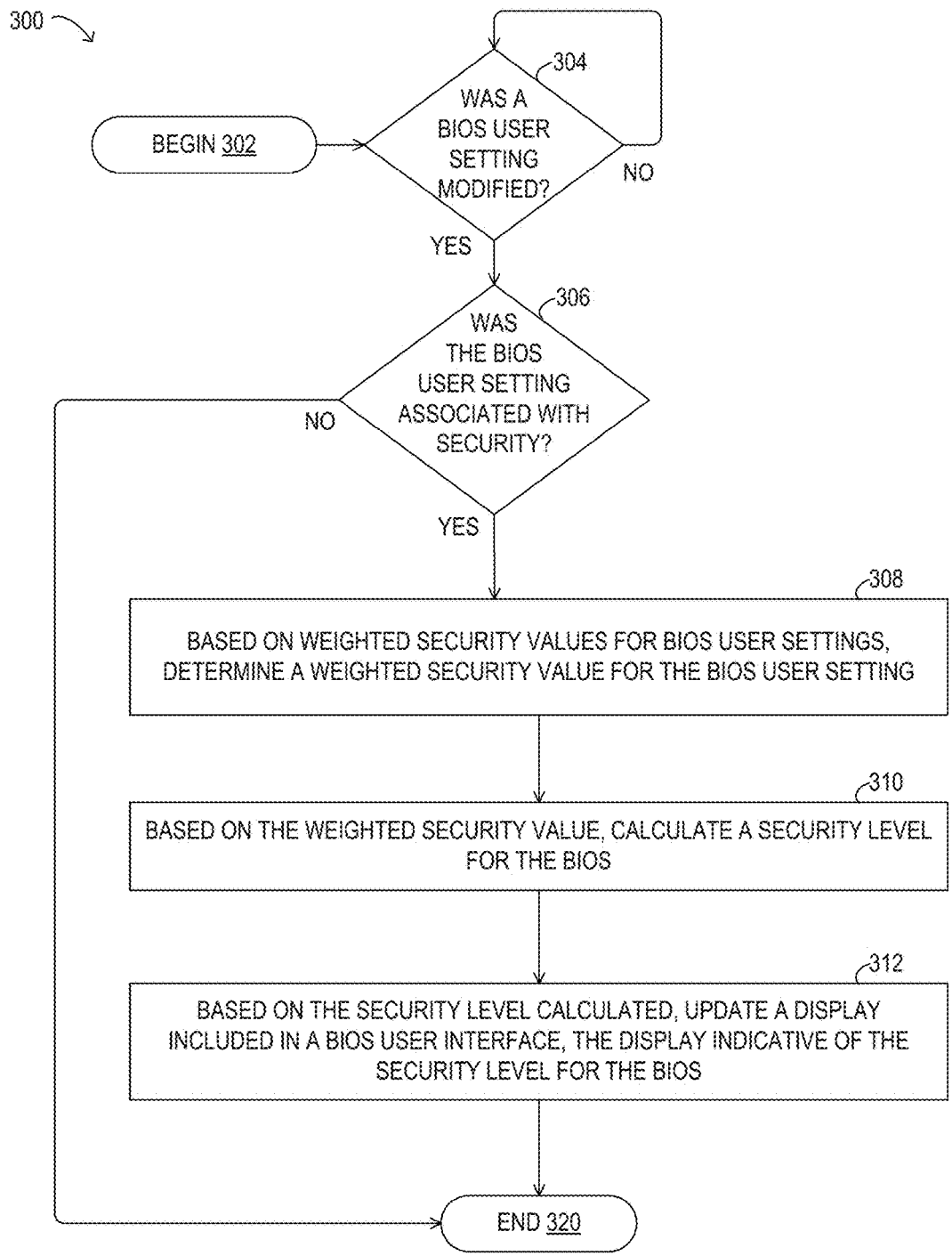
FIG. 3 is a flowchart depicting selected elements of an embodiment of a method for generating a BIOS security display.

Referring now to FIG. 3, a block diagram of selected elements of an embodiment of method 300 for generating a BIOS security display, as described herein, is depicted in flowchart form. Method 300 may be performed using information handling system 100 (see FIG. 1). In particular embodiments, method 300 is performed by BIOS firmware 192. It is noted that certain operations described in method 300 may be optional or may be rearranged in different embodiments. It is noted that method 300 may be executed or repeated when a user has access to BIOS user settings.

Method 300 may begin at operation 302. Then, a decision may be made whether a BIOS user setting was modified (operation 304). When the result of operation 304 is NO, method 300 may loop back to operation 304, indicating a waiting or a polling until the result of operation 304 is YES. When the result of operation 304 is YES, a decision may be made whether the BIOS user setting was associated (operation 306) with security. In certain embodiments, the decision in operation 306 may be based on the mapping shown in Table 2, for example, by accessing a database including the mapping in Table 2. When the result of operation 306 is NO, method 300 may end at operation 320. When the result of operation 306 is YES, based on weighted security values for BIOS user settings, a weighted security value of the BIOS user setting may be determined (operation 308). Based on the weighted security value, a security level for the BIOS may be calculated (operation 310). Based on the security level calculated, a display included in a BIOS user interface may be updated (operation 312), the display indicative of the security level for the BIOS. Method 300 may end at operation 320.

Figure 4:
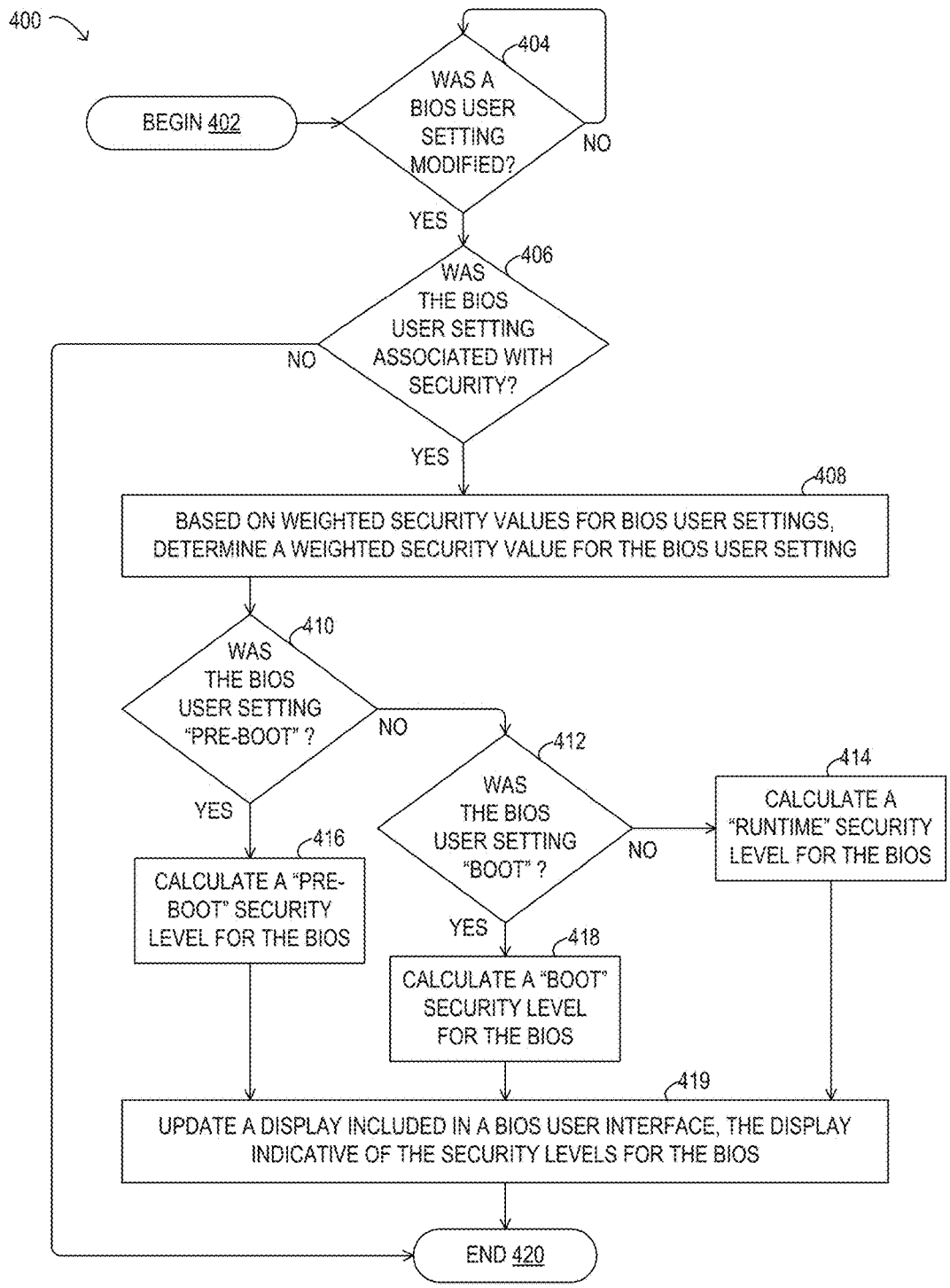
FIG. 4 is a flowchart depicting selected elements of an embodiment of a method for generating a BIOS security display.

Referring now to FIG. 4, a block diagram of selected elements of an embodiment of method 400 for generating a BIOS security display, as described herein, is depicted in flowchart form. Method 400 may be performed using information handling system 100 (see FIG. 1). In particular embodiments, method 400 is performed by BIOS firmware 192. It is noted that certain operations described in method 400 may be optional or may be rearranged in different embodiments. It is noted that method 400 may be executed or repeated when a user has access to BIOS user settings. In particular, method 400 may be based on the boot phases shown in Table 1.

Method 400 may begin at operation 402. Then, a decision may be made whether a BIOS user setting was modified (operation 404). When the result of operation 404 is NO, method 400 may loop back to operation 404, indicating a waiting or a polling until the result of operation 404 is YES. When the result of operation 404 is YES, a decision may be made whether the BIOS user setting was associated (operation 406) with security. In certain embodiments, the decision in operation 406 may be based on the mapping shown in Table 2, for example, by accessing a database including the mapping in Table 2. When the result of operation 406 is NO, method 400 may end at operation 420. When the result of operation 306 is YES, based on weighted security values for BIOS user settings, a weighted security value of the BIOS user setting may be determined (operation 408). Then, a decision may be made whether the BIOS user setting was "PRE-BOOT" (operation 410). When the result of operation 410 is YES, a "PRE-BOOT" security level may be calculated (operation 416) for the BIOS. The "PRE-BOOT" security level may correspond to the boot phase security level in Table 5. When the result of operation 410 is NO, a decision may be made (operation 412) whether the BIOS user setting was "BOOT". When the result of operation 412 is YES, a "BOOT" security level may be calculated (operation 418) for the BIOS. The "BOOT" security level may correspond to the boot phase security level in Table 5. When the result of operation 412 is NO, a "RUNTIME" security level may be calculated (operation 414) for the BIOS. The "RUNTIME" security level may correspond to the boot phase security level in Table 5. After operations 416, 418, or 414, a display included in a BIOS user interface may be updated (operation 419), the display indicative of the security level for the BIOS. Method 400 may end at operation 420.

Disclosed methods and systems for generating and using a BIOS security display include determining whether a change in a BIOS user setting is associated with security of an information handling system. When the BIOS user setting is associated with security, a security level for the BIOS may be calculated based on weighted security values for BIOS user settings. Security levels for boot phases may also be individually calculated. The security levels may be displayed in the BIOS to the user when the BIOS user setting is changed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
responsive to detecting a change in a user setting of a basic input/output system (BIOS) from an old value to a new value for an information handling system, determining whether the user setting is associated with security of the information handling system;
when the user setting is associated with security of the information handling system:
determining a weighted security value for the user setting, wherein the weighted security value indicates an importance to security of the information handling system for the user setting;
determining a boot phase associated with the user setting, the boot phase selected from: pre-boot, boot, and runtime;
based at least in part on the weighted security value, calculating a security level for the BIOS; and
updating a display element included in a BIOS user interface, the display element indicative of the security level for the BIOS for the boot phase.

2. The method of claim 1, wherein determining the weighted security value for the user setting includes:
accessing a lookup table of weighted security values for user settings of the BIOS.

3. The method of claim 2, wherein the lookup table is stored in a non-volatile memory accessible to the BIOS.

4. The method of claim 1, wherein determining the weighted security value for the user setting includes:
determining the weighted security value for a plurality of user settings associated with the boot phase, including the user setting.

5. The method of claim 4, wherein calculating the security level for the BIOS includes:
calculating the security level for the boot phase.

6. The method of claim 5, wherein the BIOS user interface includes respective display elements for different boot phases, and wherein updating the display element includes:
updating the display element indicative of the security level for the boot phase.

7. An information handling system, comprising:
a microprocessor subsystem having access to a non-volatile memory comprising a basic input/output system (BIOS), wherein the BIOS includes BIOS instructions executable by the processor subsystem to:
detect a change in a user setting of the BIOS from an old value to a new value;
determine whether the user setting is associated with security of the information handling system;
when the user setting is associated with security of the information handling system:
determine a weighted security value for the new value of the user setting, wherein the weighted security value indicates an importance to security of the information handling system for the new value;
determine a boot phase associated with the user setting, the boot phase selected from: pre-boot, boot, and runtime;
based at least in part on the weighted security value, calculate a security level for the BIOS; and
update a display element included in a BIOS user interface, the display element indicative of the security level for the BIOS for the boot phase.

8. The information handling system of claim 7, wherein the instructions to determine the weighted security value for the user setting include instructions to:
access a lookup table of weighted security values for user settings of the BIOS.

9. The information handling system of claim 8, wherein the lookup table is stored in a non-volatile memory accessible to the BIOS.

10. The information handling system of claim 7, wherein the instructions to determine the weighted security value for the user setting include instructions to:
determine the weighted security value for a plurality of user settings associated with the boot phase, including the user setting.

11. The information handling system of claim 10, wherein the instructions to calculate the security level for the BIOS include instructions to:
calculate the security level for the boot phase.

12. The information handling system of claim 11, wherein the BIOS user interface includes respective display elements for different boot phases, and wherein the instructions to update the display element include instructions to:
update the display element indicative of the security level for the boot phase.

13. An article of manufacture comprising:
a non-transitory computer-readable medium storing instructions, the instructions representing a basic input/output system (BIOS) for an information handling system, that, when executed by a processor of the information handling system, cause the processor to:
detect a change in a user setting of the BIOS from an old value to a new value;
determine whether the user setting is associated with security of the information handling system;
when the user setting is associated with security of the information handling system:
determine a weighted security value for the new value of the user setting, wherein the weighted security value indicates an importance to security of the information handling system of the new value;
determine a boot phase associated with the user setting, the boot phase selected from: pre-boot, boot, and runtime;
based at least in part on the weighted security value, calculate a security level for the BIOS; and
update a display element included in a BIOS user interface, the display element indicative of the security level for the BIOS for the boot phase.

14. The article of manufacture of claim 13, wherein the instructions to determine the weighted security value for the user setting include instructions to:
access a lookup table of weighted security values for user settings of the BIOS.

15. The article of manufacture of claim 14, wherein the lookup table is stored in a non-volatile memory accessible to the BIOS.

16. The article of manufacture of claim 13, wherein the instructions to determine the weighted security value for the user setting include instructions to:
   determine the weighted security value for a plurality of user settings associated with the boot phase, including the user setting.

17. The article of manufacture of claim 16, wherein the instructions to calculate the security level for the BIOS include instructions to:
   calculate the security level for the boot phase.

18. The article of manufacture of claim 17, wherein the BIOS user interface includes respective display elements for different boot phases, and wherein the instructions to update the display element include instructions to:
   update the display element indicative of the security level for the boot phase.

* * * * *